UNITED STATES PATENT OFFICE.

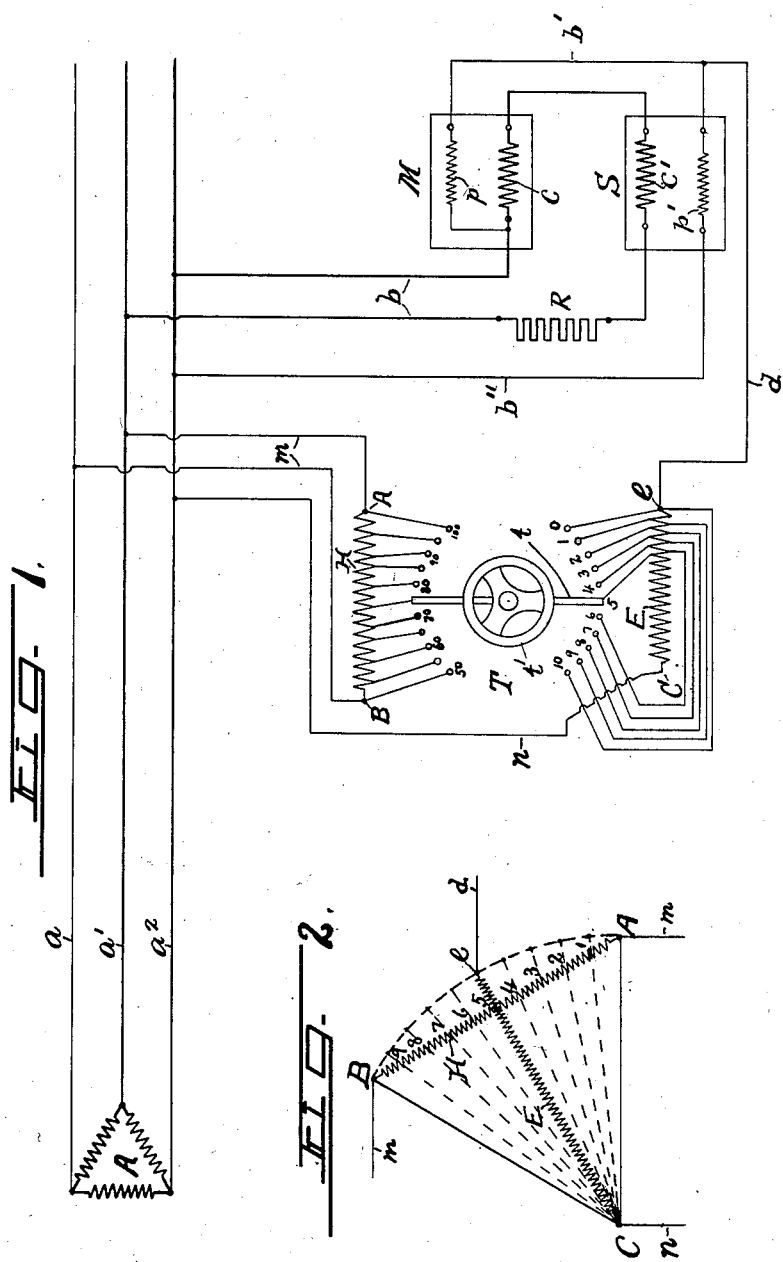

HENRY J. BLAKESLEE, OF SYRACUSE, NEW YORK.

PHASE-MODIFYING APPARATUS.

1,175,222.  Specification of Letters Patent.  Patented Mar. 14, 1916.

Application filed March 8, 1912. Serial No. 682,446.

*To all whom it may concern:*

Be it known that I, HENRY J. BLAKESLEE, of Syracuse, in the county of Onondaga, in the State of New York, have invented new and useful Improvements in Phase-Modifying Apparatus, of which the following, taken in connection with the accompanying drawings, is a full, clear, and exact description.

This invention relates to an apparatus for modifying the phase relation between the current and electro-motive forces in testing alternating current meters.

In order that my invention may be clearly understood, it may be stated that when an electric meter and particularly a watt meter or watt-hour meter is used on alternating current circuits it should accurately measure true power or energy not only when the current passing through the series winding and the electro-motive force impressed upon the shunt winding are co-incident in phase relation but also when the phase of such current and electro-motive force are not co-incident. In other words the meter should register correctly in a circuit of unity power factor and also in a circuit of less than such factor.

In determining whether or not a meter registers correctly under different conditions of phase relation of current and electro-motive force, or, as more commonly expressed, under different power factors, its registration under such different conditions must be compared with the true values or amounts which it should register. In the case of watt-meters or watt-hour meters this comparison is usually made by comparing such meter with a standardized meter of the same class. The different conditions of phase relation in current and electro-motive force are customarily brought about by changes in the phase of the current, the time phase of the electro-motive force remaining substantially unchanged. When meters are tested in a laboratory, the common practice for obtaining a power factor of less than unity is to produce a lagging current by means of an inductive load or by means of inductive apparatus introduced into the path of the current.

One of the objects of my present invention is to provide simple means whereby different conditions of phase relations are produced at will by changing the phase of the electro-motive force, the phase of the current remaining substantially constant or in a substantially constant relation to the phase of the impressed electro-motive force in the circuit supplying the current. In other words I have sought to obviate the use of inductive load devices which usually consist of coils of wire wound upon iron cores and are more or less expensive and must be provided in addition to the non-inductive resistances.

Another object is to enable the phase relation to be predetermined so that it will be unnecessary to use a power factor meter or to compute such factor from instrument readings.

A further object is to enable the phase relation to be kept substantially constant and at the desired value, while the amount of current through the meter series coil is varied over a wide range or percentage which is a great convenience and an advantage over the usual method whereby changes in the current are accompanied by changes in the phase relation.

Other objects and uses will be brought out in the following description:

In the drawings Figure 1 is a diagrammatic view of a meter testing system embodying various features if my invention. Fig. 2 is a geometric illustration of a method of changing the phase.

The apparatus forming the subject matter of my present invention is adapted to be used in connection with any alternating current circuit and in order that it may be clearly understood, I have shown a three-phase generator —A— and circuit wires —a—, —a'— and —a²— connected thereto.

The meter under test as —M— and also the standardized meter as —S— are shown as having their current winding —c— and —c'— connected in series with each other and across the main line circuit by wires —b— and include in such connection a non-inductive current receiving device such as a non-inductive resistance —R— in series with the current wind'ngs of the meter under test and standardized meter. The potential windings as —p— and —p'— of these meters are connected in multiple with each other.

The functions and operation of the parts thus far described are well known to those skilled in this art and it will therefore be unnecessary to further describe the same except as they are correlated to the means hereinafter described for changing the phase of the electro-motive force impressed upon the shunt coil $p$ of the meter. In order that this change in the phase relation may be clearly understood I have shown in Fig. 2 a geometric diagram illustrating the method of bringing about these phase changes, said diagram being triangular and having its three sides as AB, BC and CA representing the electro-motive forces between the three conductors of a triphase circuit in their phase relations.

A current receiving device, as an impedance coil or auto transformer —E— is connected to one of the points as —C— of the triangular diagram and is adapted to be brought into contact with any one of a number of different points as 1, 2, 3, 4, etc., in another impedance coil or auto transformer —H— in the opposite side as AB for producing corresponding differences in phases. For example, if this current receiving device or impedance coil —E— is connected between the point —C— and the contact point —1—, the electro-motive force impressed upon the part —E— will differ in phase from the electro-motive force between CA by that part of a period which the angle (—1— CA) bears to 360° and in like manner other differences in phase can be produced by connecting the impedance coil —E— between the point —C— and the contace points 2, 3, 4, etc., in the side AB of the impedance coil —H—.

It is evident that if the current to the meter —M— is taken between CA through a non-inductive load, and the shunt coil $p$ of the meter —M— is connected between the point —C— and the contact points 1, 2, 3, etc., selectively, the phase relation of electro-motive force and current supplied to the meter —M— may be changed at will. It is also evident that if the shunt coil of the meter —M— is connected between the point —C— and the contact points 1, 2, 3, etc., selectively, the voltage supplied to said shunt coil will be different in amount when connected to one point as —1— from that when connected to either of the other points as —2— and in order to maintain the same value of voltage, it is advisable to connect the shunt winding $p$ of the meter —M— to one end of the impedance coil —E— which is provided with a series of taps so arranged that by connecting the proper tap of the impedance coil —E— to the proper tap of the other impedance coil —H—, it not only controls the phase but also holds the voltage in the shunt or potential windings —$p$— and —$p'$— substantially constant. These results may be accomplished by the use of many different forms of apparatus and in Fig. 1 is shown diagrammatically a simple exemplification of such apparatus —T— involving the use of two auto-transformers or impedance coils —E— and —H— each having a series of taps or contact points numbered respectively 1, 2, 3, 4, etc., and 50, 60, 70, 80, etc., arranged reversely in sequence from one end of each coil and at opposite sides of and around a common axis of a rotary electric conductor or switch member —$t$— having a suitable operating member —$t'$— for rotating the switch member —$t$— so as to connect diametrically opposite taps selectively.

Referring now to the diagram in Fig. 2 in which the sides AB, BC and CD represent both the relative values and phase relations of the electro-motive forces existing in a normal three phase circuit, and —H— represents an auto-transformer connected so as to receive electro-motive forces AB, and E another transformer connected wholly or in part between the point —C— and point —5—, then following from the well known fact that two alternating electro-motive forces of different values and phases combine to form a resultant which in amount and phase is dependent upon the value and time phase of each, it will be readily seen by anyone conversant with this art that the electro-motive forces between C and 5 will be the resultant of the electro-motive forces CA and A5 and will have a value $e5$ and the phase shown by the direction of the line C5.

If an auto-transformer —E— is connected to the electro-motive force C5 and is provided with an extension to its winding having a number of turns which bear the same relation to the number of turns in the portion connected to the electro-motive force C, that the length $5e$ bears to the length C5, the electro-motive forces between the extreme ends of the auto-transformer E will be equal in amount to the electro-motive force CA. In like manner it may be shown how the electro-motive forces of other values and phases exist between the point C and points 1, 2, 3, etc., and also how the auto-transformer E may be provided with proper taps in order to deliver the same value of electro-motive force as is represented by the line CA. In each of such cases the taps used in the auto-transformer E must be made at such a point in this winding that the number of turns in the portion between the tap and the end that will be connected to the point of the circuit represented by C will bear the same ratio to the whole number of turns as the distances C1, C2, or C3, etc., bear to the distance CA.

Now referring again to the phase changing apparatus T shown diagrammatically in Fig. 1, the contacts 1, 2, 3, 4, etc., are tapped into a portion of the impedance coil —E— corresponding to that portion of the same coil shown in Fig. 2 intersecting and projecting beyond the impedance coil —H— so that by connecting these taps or contacts 1, 2, 3, 4, etc., in sequence or selectively with the diametrically opposite taps or contacts 50, 55, 60, etc., of the impedance coil —H—, the effect is the same as that described for the diagram 2, viz: to change the phase in the potential winding of the meter. In order that this result may be brought about, the impedance coil —H— is connected by wires —m— across the circuit lines —a— and —a'—, while the other impedance coil —E— has one end connected by a wire —n— to the circuit line —a²— and its opposite end connected by wires —d— and —b'— to the shunt or potential windings —p— and —p'— of the meters —M— and —S—. For example, by shifting the switch member —t— from its zero position so as to electrically connect the diametrically opposite taps in sequence or selectively, the phase in the current receiving device —E— and also in the potential or shunt coil of the meter will be correspondingly changed, thus permitting the phase in the potential or shunt winding of the meter to be readily varied while the voltage value remains substantially the same or the phase kept substantially at any desired value and the amount of current through the meter series coils varied over a wide range or percentage.

What I claim is:

1. Apparatus for modifying the phase of the electro-motive force impressed upon the shunt of an electric meter irrespective of the phase of the current passing through such meter, comprising two auto-transformers, one of which has means for connecting it in one phase of an alternating current source and the other having means for connecting it to one of the conductors of a different phase of the same source and provided with means for connecting it to the shunt of a meter, said auto-transformers having separate series of taps intermediate their end leads, and means for selectively connecting the taps of one series with those of the other series in such manner as to keep the value of the electro-motive force in the shunt constant.

2. An apparatus for modifying the phase relation in the shunt of an electric meter irrespective of the phase relation in the series winding thereof comprising an auto-transformer having means for connecting it in one phase of an alternating current source and provided with a series of taps, a separate transformer having means for connecting it to one of the conductors of a different phase of the same source and also provided with a series of taps, means for connecting it to the shunt of a meter, and means for selectively connecting the taps of one series with those of the other series in such manner as to keep the value of the electro-motive force in the shunt constant.

In witness whereof I have hereunto set my hand on this 2nd day of March, 1912.

HENRY J. BLAKESLEE.

Witnesses:
H. E. CHASE,
E. S. TUCKER.